United States Patent [19]
Cote et al.

[11] Patent Number: 4,849,899
[45] Date of Patent: Jul. 18, 1989

[54] METHOD FOR CONTROLLING AMT SYSTEM INCLUDING SPEED SENSOR SIGNAL FAULT DETECTION AND TOLERANCE

[75] Inventors: William F. Cote, Farmington Hills; Donald Speranza, Canton, both of Mich.

[73] Assignee: Eaton Corporation, Cleveland, Ohio

[21] Appl. No.: 848,544

[22] Filed: Apr. 7, 1986

[51] Int. Cl.$^4$ ............................................. G01M 19/00
[52] U.S. Cl. ............................ 364/424.01; 192/0.033; 74/866
[58] Field of Search ............... 364/424.1, 431.11, 551; 74/856, 866, 335; 192/0.076, 0.033; 73/118.1

[56] References Cited

U.S. PATENT DOCUMENTS

| | | | |
|---|---|---|---|
| 4,361,060 | 11/1982 | Smyth | 74/866 |
| 4,432,445 | 2/1984 | Windsor et al. | 192/0.076 |
| 4,493,228 | 1/1985 | Vukovich et al. | 74/866 |
| 4,527,447 | 7/1985 | Richards | 74/866 |
| 4,551,802 | 11/1985 | Smyth | 364/424.1 |
| 4,558,772 | 12/1985 | Grimes et al. | 192/0.076 |
| 4,561,530 | 12/1985 | Parsons et al. | 192/0.076 |
| 4,593,357 | 6/1986 | Van Ostrand et al. | 364/424 |
| 4,644,540 | 2/1987 | Kahimzad | 371/16 |
| 4,669,046 | 5/1987 | Kubo | 364/426 |
| 4,700,563 | 10/1987 | Iwata et al. | 73/118.1 |
| 4,718,013 | 1/1988 | Kubo | 364/426 |

Primary Examiner—Parshotam S. Lall
Assistant Examiner—Ellis B. Ramirez
Attorney, Agent, or Firm—H. D. Gordon

[57] ABSTRACT

A method for controlling an AMT system (10) is provided including sensing and identifying faulty input signals (ES, IS, OS) from the engine speed sensor (28), the input shaft speed sensor (32) and/or the output shaft speed sensor (36) and, if only one of the speed signals (ES, IS or OS) is faulty, modifying the logic method of control (42) to a logic method tolerant of the identified faulty input signal.

42 Claims, 6 Drawing Sheets

METHOD FOR CONTROLLING AMT SYSTEM INCLUDING SPEED SENSOR SIGNAL FAULT DETECTION AND TOLERANCE

BACKGROUND OF THE INVENTION

1. Field of the Invention

This invention relates to automatic power transmissions providing a plurality of gear reduction ratios, such as automatic mechanical transmissions (i.e. "AMTs"), and, to control systems and methods therefor. In particular, the present invention relates to control systems and methods for automatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a method for controlling an AMT system utilizing sensors for providing input signals indicative of engine, transmission input shaft and transmission output shaft rotational speeds including sensing of a faulty signal from one of such sensors and modifying the system operation logic in tolerance of such fault.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semiautomatic transmission control systems for vehicles may be seen by reference to U.S. Pat. Nos. 4,361,060; 4,551,802; 4,527,447; 4,425,620; 4,463,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

While the above referenced automatic/-semiautomatic transmission control systems, and similar systems, are effective to control an automatic transmission by selecting a desired gear ratio which will tend to optimize the fuel economy and/or performance of the vehicle in view of the sensed parameters and then commanding a shift into the selected gear ratio, such control systems were not totally acceptable as the predetermined programs utilized did not include logic routines, or methods, to recognize and identify a fault in the input signals from one of the speed sensors and/or could not modify the predetermined program to provide a tolerance to such a sensed fault.

SUMMARY OF THE INVENTION

In accordance with the present invention, the drawbacks of the prior art have been overcome or minimized by providing a control system, preferably an electronic control system, and control method, for automatic/semiautomatic mechanical transmission systems wherein gear selection and shift decisions are made and/or executed based upon measured and/or calculated parameters including at least input signals indicative of engine speed, transmission input shaft speed and transmission output shaft speed. Other inputs/parameters, such as signals indicative of throttle position and/or rate of change of throttle position, condition of the master clutch, currently engaged gear ratio, operation of the vehicle brakes, and the like are also utilized to make decisions for control of the AMT system.

The predetermined logic rules or programs by which the various input signals are processed include a method for detecting a fault in the input signals from one or more of the speed sensors and a method for modifying the predetermined logic in response to a sensed fault in any one of the speed sensors to provide an acceptable, if less than optimal, set of logic rules for continuing operation of the AMT system until such time as the fault ceases or is corrected.

A speed sensor input signal is considered to be faulty if the value thereof is not, within acceptable tolerance limits, indicative of the true rotational speed of the device monitored by the relevant sensor.

The above is accomplished by establishing a set of relationships between the engine speed signal, the transmission input shaft speed signal and the transmission output shaft speed signal which, under defined condition, must be true. If, under the defined conditions, these relationships are not true, a fault in the input signals from one or more of the sensors exists, and various relationships are evaluated to identify the one or more faulty sensors. If only one sensor is in fault, the logic routines are modified to allow a continued system operation, in tolerance of such a sensed fault, until such time as the fault disappears (i.e. self-corrects) and/or is corrected.

Utilizing an alternate control method or algorithm structured specifically to a sensed non-standard condition, such as a sensed faulty input signal, in place of the control algorithm utilized in the absence of such non-standard conditions is, for purposes of describing this invention, referred to a modification to the control algorithm or program by which the input signals are processed for issuing the command output signals by which the AMT is controlled.

Accordingly, it is an object of the present invention to provide a new and improved control method for automatic mechanical transmission systems which involves sensing and identifying a fault in the speed sensors and modifying the logic routines or algorithms by which the system is operated in tolerance of such sensed fault.

This and other objects and advantages of the present invention will become apparent from a reading of the description of the preferred embodiment taken in connection with the attached drawings.

DESCRIPTION OF THE PREFERRED EMBODIMENT

Figure 1:
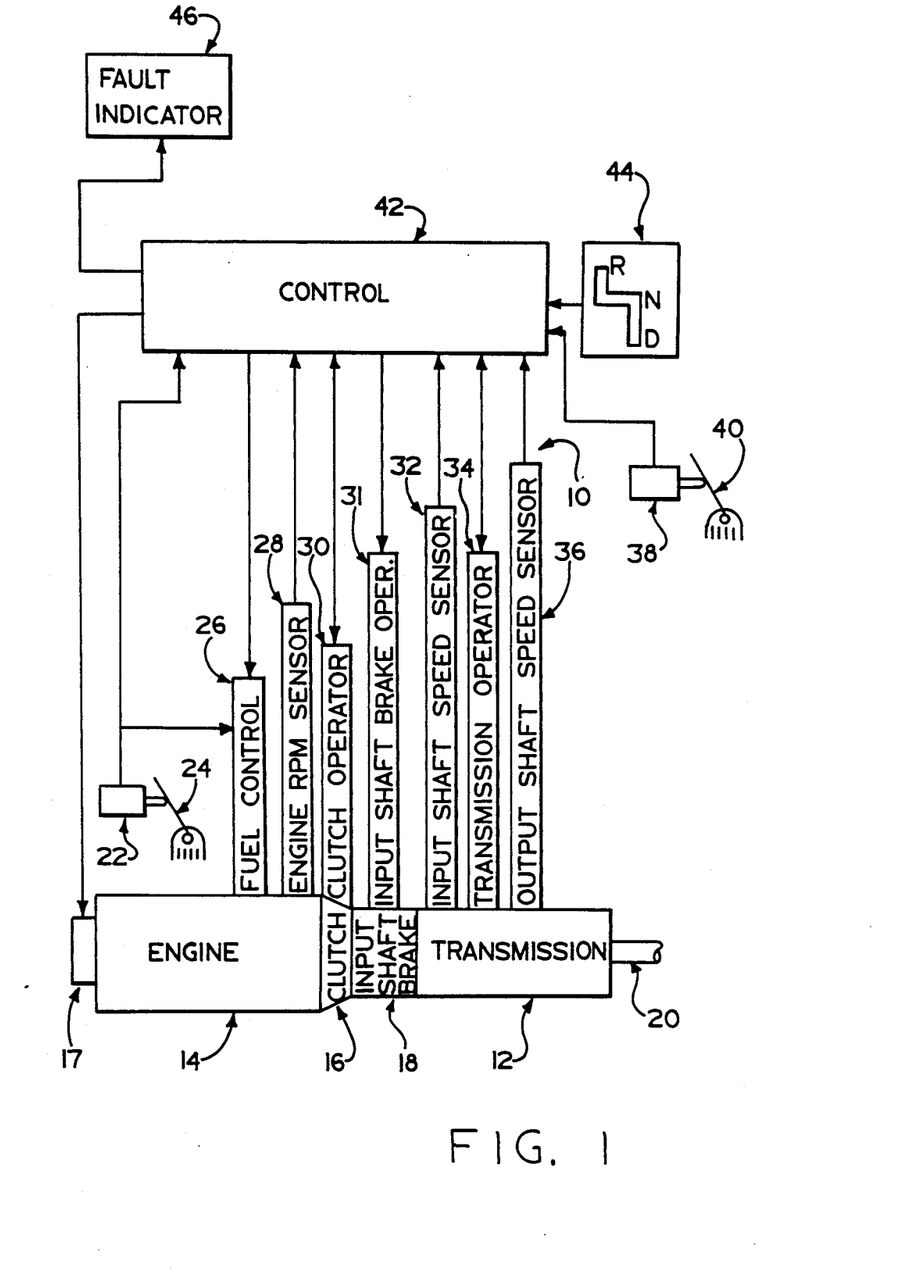
FIG. 1 is a schematic illustration of the components and interconnections of the automatic mechanical transmission control system of the present invention.
Figure 2A:
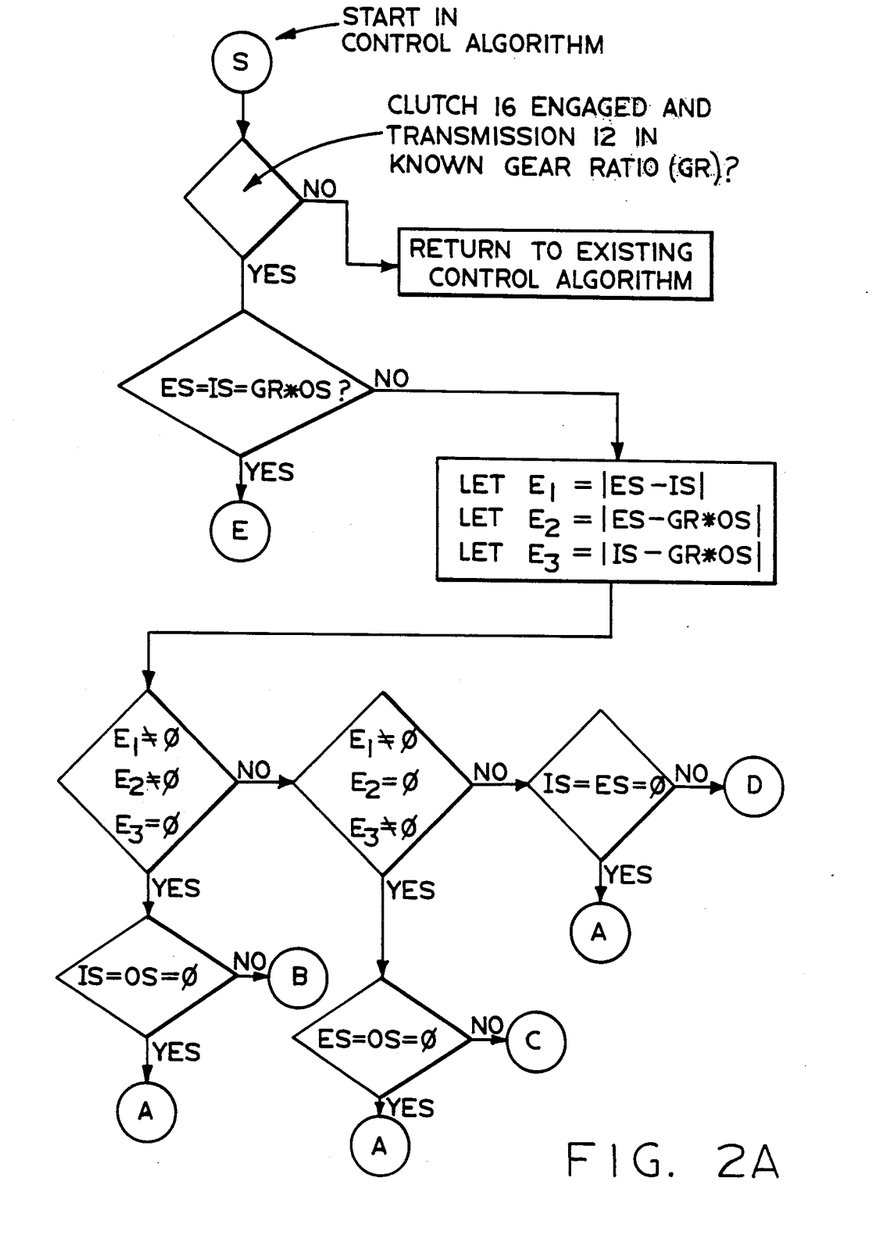
FIGS. 2A–2E are symbolic illustrations, in the form of a flow chart, illustrating the preferred manner of practicing the method of the present invention.
Figure 2B:
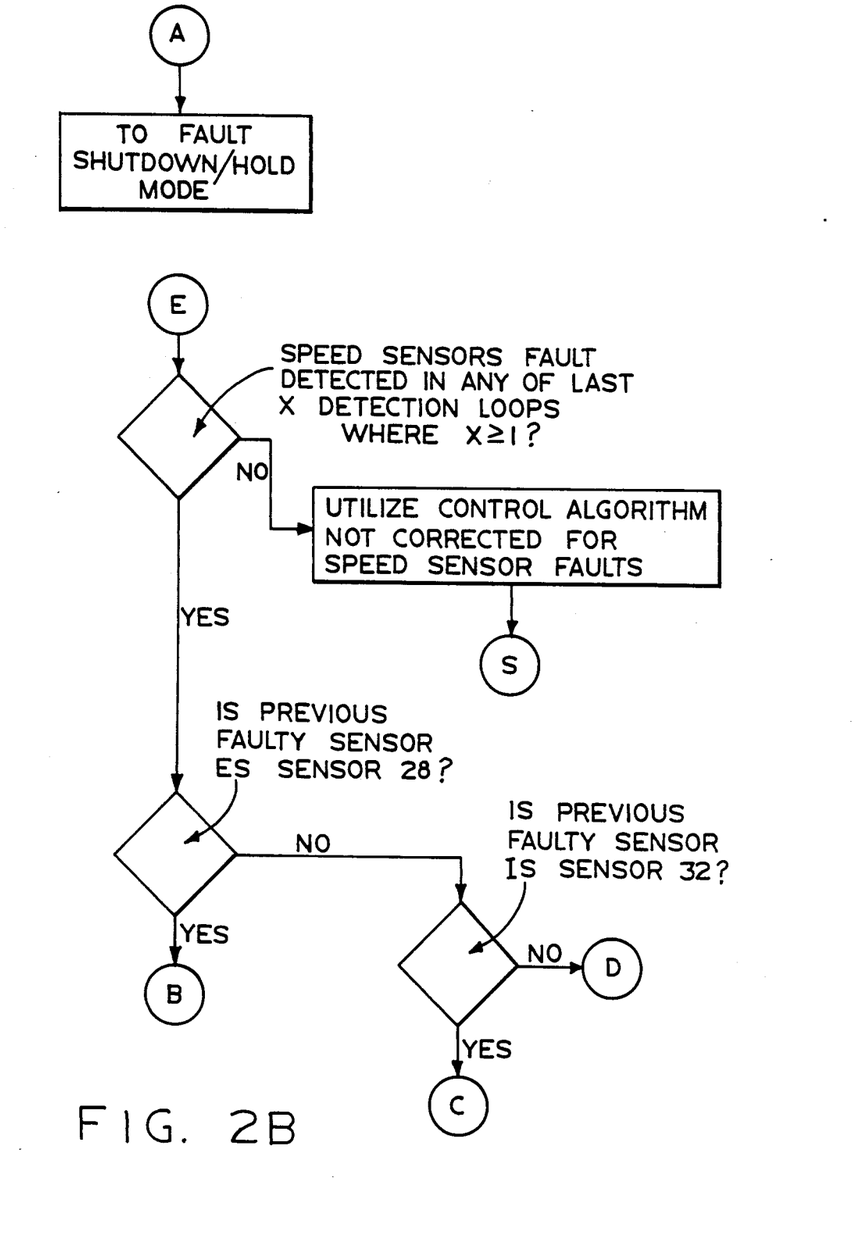
Figure 2C:
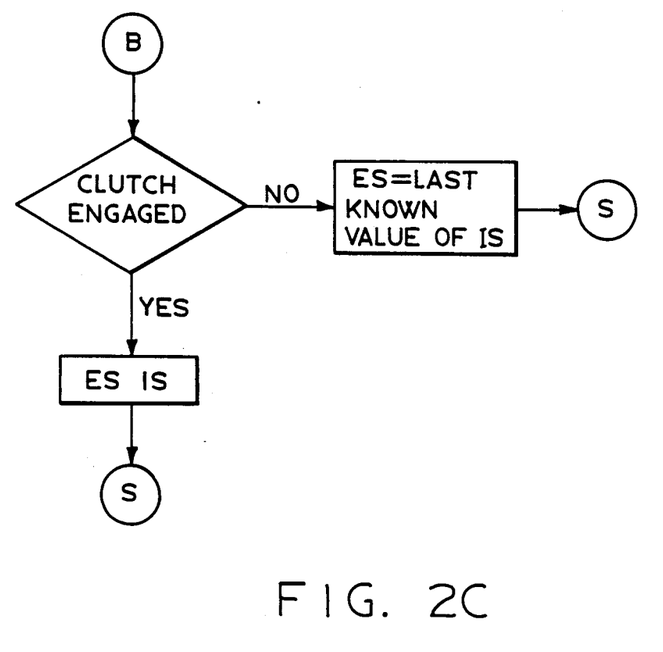
Figure 2D:
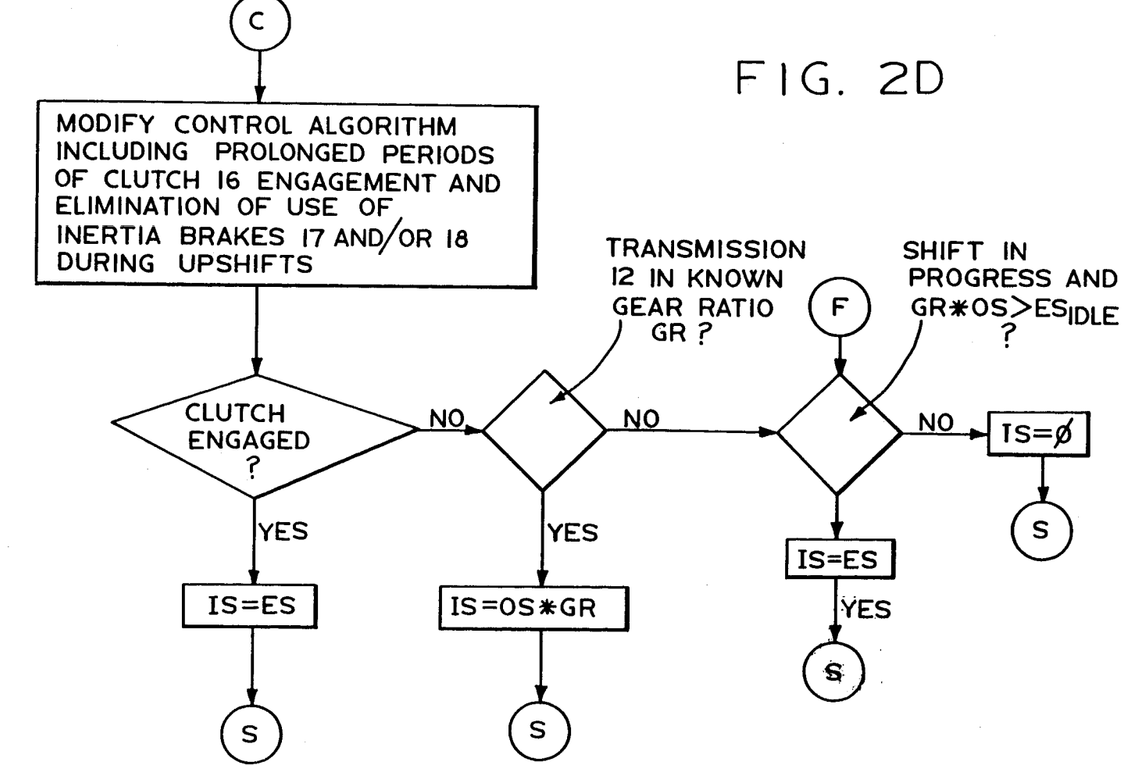
Figure 2E:
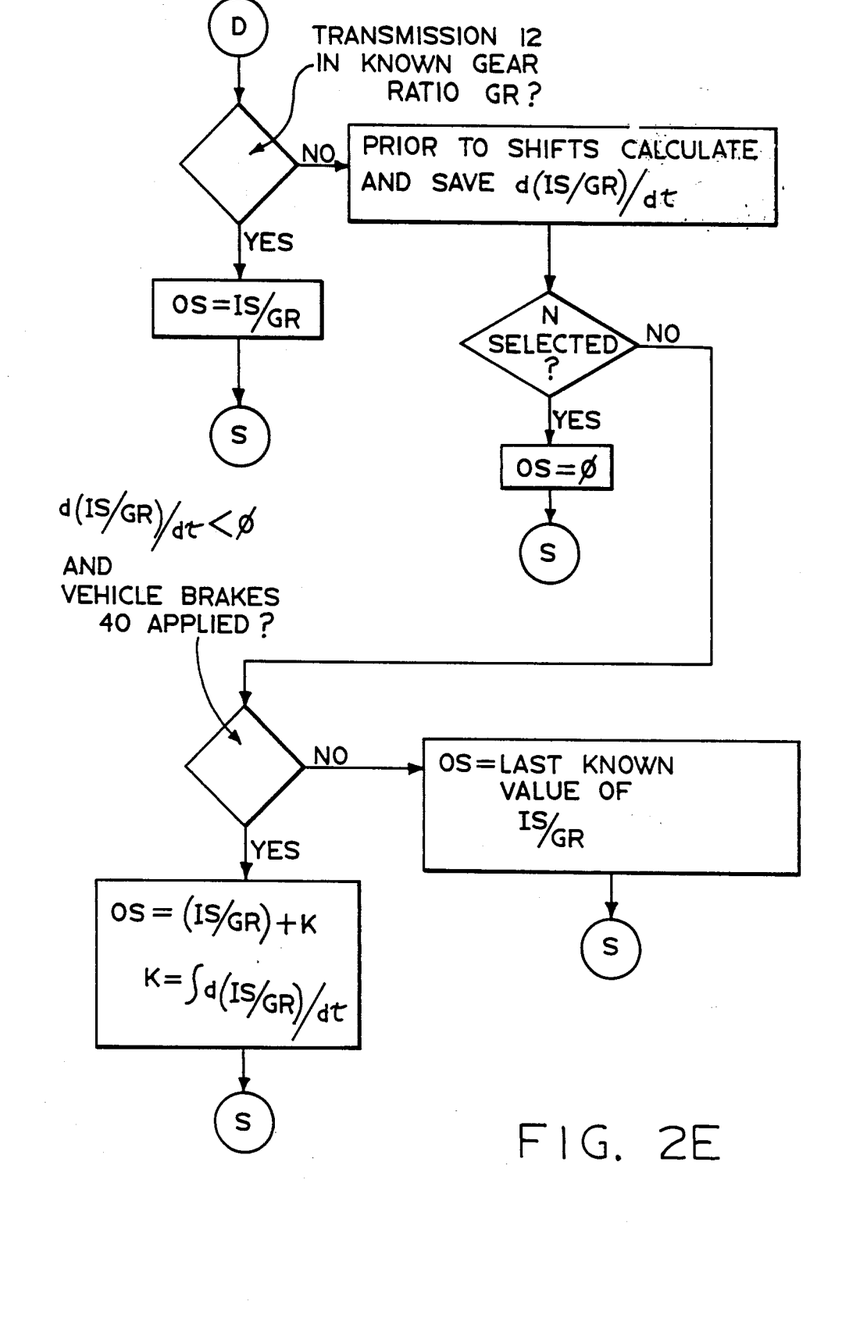

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adopted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of currently engaged ratio, and a transmission output shaft speed sensor 36. Alternatively, the gear ratio can be calculated by comparison of the input shaft and output shaft speeds. A vehicle brake monitor 38 senses actuation of vehicle brake pedal 40.

The above mentioned devices supply information to and/or accept commands from a central processing unit 40 or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above mentioned U.S. Pat. Nos. 4,361,060; 3,776,048; 4,038,889 and 4,226,295.

Sensors 22, 28, 32, 36, 38 and 44 may be of any known type or construction for generating analogue or digital signals proportional to the parameter monitored thereby. Similarly, operators 17, 31, 26, 30 and 34 may be of any known electrical, pneumatic or electropneumatic type for executing operations in response to command signals from processing unit 42. Fuel control 26 will normally supply fuel to engine 14 in accordance with the operator's setting of throttle 24 but may supply a lesser (fuel dip) or greater (fuel boost) amount of fuel in accordance with commands from control unit 42.

The purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to allowed pending U.S. patent application Ser. No. 659,114 filed Oct. 10, 1984, and to published Society of Automotive Engineers SAE Paper No. 831776 published November 1983, the disclosures of which are hereby incorporated by reference.

The three speed sensors, namely engine speed sensor 28, transmission input shaft speed sensor 32 and transmission output shaft speed sensor 36 provides signals for processing by the central processing unit 42 which are important for optimal operation of the clutch operator 30, optimal selection of desired gear ratio and optimal synchronization of transmission 12 during an upshift or downshift.

It is important that the inputs provided by speed sensors 28, 32 and 36 be periodically verified, and, if a fault is detected, the faulty sensor or sensors be identified and, if only one of the three sensors is faulty, a modified logic be utilized to control system 10 which is tolerant to the identified faulty sensor.

The method of the present invention for verifying the inputs from the speed sensors 28, 32 and 36, for identifying a faulty sensor and for adapting an appropriate fault tolerant logic for processing the input signals is schematically illustrated on FIGS. 2A-2D. The symbol "=" is used to identify an equal, within allowed tolerance, relationship. The symbol "0" is utilized to identify the number zero and the symbol "$\neq$" is utilized to identify a not equal relationship. As stated above, the control or CPU 42 receives various input signals and processes these and/or stored information in accordance with a program of predetermined logic rules to issue command output signals for operation of the AMT system 10. The present invention is also applicable to methods for controlling AMT systems which are less than fully automated, such as systems which automatically execute shifts manually requested by the vehicle operator.

FAULT DETECTION AND ISOLATION

Periodically, preferably at least once during each period of time in which the various mechanical actuators can react to a command output signal, the logic or control method utilized in processing unit 42 will attempt to verify the nonfaulty operation of the speed sensors 28, 32 and 36, and, if a fault is detected, identify the faulty sensor and, if possible, modify the control logic in a manner tolerant to such a sensed fault.

Assuming central processing unit 42 is a microprocessor based control unit, a complete cycle of processing current and stored parameters and issuing command output signals can be accomplished in less than 15-20 milliseconds while a typical actuator, such a solenoid controlled valve or the like, will require a minimum of 20-30 milliseconds to cause even initial movements of an operator such as clutch operator 30.

Preferably, the first step is to verify the non-faulty operation of the speed sensors, and if verified to proceed with the remainder of the control algorithm. The correct operation of the sensors can be verified if two conditions are met, the coupling 16 must be fully engaged (i.e. not slipping) and the transmission must be engaged in a known ratio. Of course, this assumes the vehicle engine 14 is operating at at least ideal rpm. In a known currently engaged ratio, the gear ratio ("GR") between the input shaft and output shaft will have a known value. If the above conditions are satisfied, Engine Speed ("ES") equals Input Shaft Speed ("IS") equals the Gear Ratio ("GR") multiplied by Output Shaft Speed ("OS"), or:

$$ES = IS = GR*OS.$$

If the above is true within the tolerance allowed for acceptable operations, the speed sensors are considered to be operating without fault. It is important to note that this verification can only be performed if the master clutch 16 (or other coupling having a substantially non-slipping condition) is fully engaged and the transmission 12 is engaged in a known drive (not neutral) ratio.

If a speed sensor input signal fault or faults is detected, the identity of the faulty sensor must then be determined. To do this three error values ($E_1$, $E_2$ and $E_3$) are calculated under the required testing conditions:

$$E_1 = ES - IS$$

$$E_2 = ES - (GR * OS)$$

$$E_3 = IS - (GS * OS)$$

All of the values $E_1$, $E_2$ and $E_3$ should, when the clutch is fully engaged and a known ratio is engaged, be essentially zero in the absence of a fault. As each of the speed signals, ES, IS and OS, appear in only two of the three relationships, if any two, but not all three, of the absolute values of $E_1$, $E_2$ and $E_3$ are greater than an allowable tolerance value, the identity of the faulty or failed speed sensor can readily be identified. For example, if $E_1=0$ and $E_2 \neq 0$ and $E_3 \neq 0$, then OS is preferably the faulty input signal as OS appears in the $E_2$ and $E_3$ calculations, but not in the $E_1$ calculation.

Since the input signal from each speed sensor is involved in two of the error values, it requires an error count of two against a sensor to indicate that it is faulty. Preferably, a fault must be detected on at least two consecutive passes through the periodic speed sensor verification loop before a fault is declared. Initially, a straight forward approach of declaring any sensor that has an error count of two to be faulty is used. Subsequently, additional tests are made to determine if this is the correct interpretation of the facts.

The primary problem that can occur with the above fault determination algorithm is that many of the most likely failure modes that can occur with a speed sensor circuit will cause the output to go to zero. Therefore, it is quite possible for two sensors to fail in such a manner and wind up agreeing with each other and disagreeing with the third speed sensor input which is the one that is actually correct. The above described logic will erroneously determine that the two bad sensors are correct and the third one that is actually OK has failed. Therefore, further checks are required to detect this condition.

The method used depends on the fact that the transmission 12 should never be in gear with the clutch 16 engaged when all three shafts are at zero RPM. Therefore, if two shaft sensors ever agree during the fault checks and they are at zero RPM, then they have failed and the third sensor is probably accurate. The accuracy of the third sensor cannot be verified since there is nothing to check it against and is irrelevant at any rate because the detection of two failed sensors preferably causes the transmission system 10 to go into a fault hold mode.

FAILED SENSOR DATA CORRECTIONS

Should a single faulty speed sensor input signal be identified, it is desirable that a warning of such failure be provided so that corrective action may be taken, and that the control algorithms be modified so that the vehicle can continue to operate until such time as the fault self-corrects or is corrected. For this reason a fault alarm/indicator 46 is provided which preferably will identify the particular faulty sensor(s).

A separate and slightly different approach is taken in solving the problem of correcting the identified faulty speed input signal values for each of the engine 14, input shaft and output shaft 20. These fault tolerance modifications will be discussed separately below.

ENGINE SPEED SENSOR 28 CORRECTION

The engine speed, ES, is least important for proper synchronization of the transmission. Ordinarily it is only used to provide for closed loop control of clutch 16 engagement when starting the vehicle from a stop (as described in above-mentioned U.S. Pat. No. 4,081,065) and for synchronization of the engine with the input shaft during reengagement of the clutch after a shift.

The approach used to correct the engine speed value is to make ES equal to IS whenever the clutch is engaged. When the clutch is not engaged, ES is assumed to be the last known IS value and an open loop method of clutch engagement is utilized for vehicle starts and for reapplication of power after a shift.

INPUT SHAFT SPEED SENSOR 32 CORRECTION

The input shaft speed input signal, IS, is considerably more important to the system than the engine speed since it is required for synchronization during a shift. Therefore, greater efforts must be made to accurately determine the input shaft speed at all times.

If the clutch 16 is engaged, then the input shaft speed, IS, is set equal to the engine speed, ES. If the clutch is not engaged but the transmission is in gear, then the input shaft speed is set equal to the output shaft speed times the overall gear ratio of the transmission, OS * GR. If the transmission is neither in gear nor is the clutch engaged then, if a shift is in progress and GR * OS is greater than ES idle, IS=ES, otherwise the input shaft speed is assumed to be zero.

The above method for modifying the control logic in view of faulty IS values works out quite well due to the fact that the synchronization algorithms for the transmission are preferably modified slightly when an input shaft sensor has been found to have failed by keeping the clutch engaged nearly all the time during a shift and eliminating the use of the inertia brake 18 on upshifts.

OUTPUT SHAFT SPEED SENSOR CORRECTION

The output shaft speed input signal, OS, is the most critical for proper transmission operation and is also the one that is most difficult to compensate for upon failure. The problem is that in System 10, when the transmission 12 is out of gear there is absolutely no other way to accurately determine the output shaft speed. The method for achieving synchronization upon loss of this sensor is to examine the state of the system before the transmission is taken out of gear and to presume that nothing is going to change substantially during the brief interval while it is not in gear.

If the transmission is in gear the output shaft speed is set equal to the input shaft speed divided by the overall gear ratio of the transmission (i.e. OS=IS/GR). Furthermore, on the first pass through the periodic loop where a shift in progress is found to be true, the current acceleration value calculated for the output shaft, d(IS/GR)/dt, is saved (this occurs well before the transmission is actually taken out of gear).

If the transmission is taken out of gear then the following scheme is used. If neutral is being selected by the driver then OS is set to zero. Otherwise, if the saved value for output shaft acceleration is less than zero and the brake switch 38 indicates application of the brakes, then output shaft speed is decremented in a straight line fashion from the last known speed at a rate determined by the saved acceleration value. Finally, if neither of the above conditions is true then output shaft speed is held constant at the last known speed. In practice, this algorithm appears to work quite well.

Preferably, the values of the input signals from the sensors are evaluated for possible faults during each control loop and, if a sufficient number of passes through the loop occurs without detection of a fault, the previously made fault determinations will be cleared. This is important as the speed sensors can fail in an intermittent fashion.

Although the AMT system 10 has been described as utilizing a microprocessor based control 42 and the methods and operations carried out as software modes or algorithms, it is clear that the operations can also be carried out in electronic/fluidic logic circuits comprising discrete hardware components.

Clutch operator 30 is preferably controlled by the central processing unit 42 and may engage and disengage master clutch 16 as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferable, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

We claim:

1. A method for controlling an automatic mechanical transmission system for devices having a throttle-controlled engine, a transmission having a plurality of gear ratio combinations selectively engageable between a transmission input shaft and a transmission output shaft, said transmission input shaft being operatively connected to said engine by means of a selectably engagable and disengagable coupling providing a substantially nonslipping driving connection between said engine and said input shaft in the fully engaged condition thereof, said automatic mechanical transmission system comprising an information processing unit having means for receiving a plurality of input signals including (1) an input signal indicative of the fully engaged condition of the coupling; (2) an input signal indicative of the currently engaged gear ratio of the transmission; (3) an input signal indicative of the rotational speed of the engine, and (4) an input signal indicative of the rotational speed of the transmission input shaft; and (5) an input signal indicative of the rotational speed of the transmission output shaft, said processing unit including means for processing said input signals in according with a program and for generating output signals whereby said transmission system is operated in accordance with said program, and means associates with said transmission system effective in actuate said transmission system effective to actuate said transmission system to effect engagement of said gear ratio combinations in response to said output signals from said processing unit, the method characterized by:

when said transmission is engaged in a known gear ratio and said coupling is fully engaged, sensing the presence or absence of faulty input signals indicative of the rotational speeds of said engine, input shaft and output shaft if the following relationship is false:

$$ES = IS = GR*OS$$

where:
ES = the value of the input signal indicative of rotational engine speed,
IS = the value of the input signal indicative of rotational input shaft speed,
OS = the value of the input signal indicative of rotational output shaft speed, and
GR = a signal indicative of the known currently engaged gear ratio, and if only one of said input signals indicative of the rotational speeds of said engine, input shaft and output shaft is determined to be faulty, modifying said program by ignoring said identified faulty input signal and processing the remainder of said input signals in accordance with predetermined logic rules to determine an acceptable value for the identified faulty input signal.

2. The method of claim 1 wherein the identity of a faulty input signal indicative of the rotational speed of said engine, input shaft and output shaft is sensed by calculating the values of:

$$E_1 = |ES - IS|$$

$$E_2 = |ES - (GR * os)|$$

$$E_3 = |IS - (GR * OS)|$$

where:
ES = the value of the input signal indicative of rotational engine speed,
IS = the value of the input signal indicative of rotational input shaft speed, OS=the value of the input signal indicative of rotational output shaft speed, and GR=an input signal value indicative of the known currently engaged gear ratio.

3. The method of claim 2 wherein at least two of ES, IS and OS are determined to be faulty if:
$E_1$ is greater than 0,
$E_2$ is greater than 0,
$E_3 = 0$, and
IS = GR * OS = 0.

4. The method of claim 2 wherein at least two of ES, IS and OS are determined to be faulty if:
$E_1$ is greater than 0,
$E_2 = 0$,
$E_3 =$ is greater than 0, and
ES = OS = 0.

5. The method of claim 2 wherein at least two of ES, IS and OS are determined to be faulty if:
$E_1 = 0$,
$E_2$ is greater than 0,
$E_3$ is greater than 0, and
ES = IS = 0.

6. The method of claim 2 wherein OS is determined to be faulty, and ES and IS are determined to be not faulty if:
$E_1 = 0$,
$E_2$ is greater than 0,
$E_3$ is greater than 0, and
ES = IS $\neq 0$.

7. The method of claim 6 wherein said input signals additionally include (6) an input signal indicative of actuation of the vehicle brakes, and wherein if OS is determined to be faulty, and ES and IS are determined to be not faulty, the program is modified by letting OS=IS/GR if the transmission is engaged in a known gear ratio, letting OS=0 if a shift into transmission neutral is requested, causing a value equal to d(OS/GR)/dt to be calculated prior to change gear shift operations and letting OS=(IS/GR)/+K where K is proportional to the time since a shift operation commensed and to the value of d(IS/GR)/dt at initiation of the shift if d(IS/GR)/dt is less than zero and the vehicle brakes are applied, otherwise letter OS=last known value of IS/GR.

8. The method of claim 6 wherein at least two of ES, IS and OS are determined to be faulty if:
$E_1 = 0$,
$E_2$ is greater than 0,
$E_3$ is greater than 0, and
ES = OS = 0.

9. The method of claim 8 wherein said input signals additionally include (6) an input signal indicative of actuation of the vehicle brakes, and wherein if OS is determined to be faulty, and ES and IS are determined to be not faulty, the program is modified by letting OS=IS/GR if the transmission is engaged in a known gear ratio, letting OS=0 if a shift into transmission neutral is requested, causing a value equal to d(OS/GR)/dt to be calculated prior to change gear shift operations, and letting OS=(IS/GR)/+K where K is proportional to the time since a shift operation commensed and to the value of d(IS/GR)/dt at initiation of the shift if d(IS/GR)/dt is less than zero and the vehicle brakes are applied, otherwise letter OS=last known value of IS/GR.

10. The method of claim 2 wherein IS is determined to be faulty, and ES and OS are determined to be not faulty, of:
$E_1$ is greater than 0,
$E_2 = 0$,
$E_3 =$ is greater than 0, and
ES = GR * OS $\neq 0$.

11. The method of claim 10 wherein OS is determined to be faulty, and ES and IS are determined to be not faulty if:
$E_1 = 0$,
$E_2$ is greater than 0,
$E_3 =$ is greater than 0, and
ES = OS = $\neq 0$.

12. The method of claim 11 wherein at least two of ES, IS and OS are determined to be faulty if:
$E_1 = 0$,
$E_2 =$ is greater than 0,
$E_3 =$ is greater than 0, and
ES = OS = 0.

13. The method of claim 10 wherein if IS is determined to be faulty, and ES and OS are determined to be not faulty, the program is modified by letting IS=ES if the coupling is fully engaged, letting IS=OS * GR if the transmission is engaged in a known gear ratio, letting IS=ES if a shift is in progress and if GR * OS is greater than engine idle speed, and otherwise letting IS=0.

14. The method of claim 13, wherein the program is additionally modified by minimizing intervals of coupling disengagement.

15. The method of claim 10 wherein at least two of ES, IS and OS are determined to be faulty if:
$E_1$ is greater than 0,
$E_2 = 0$,
$E_3$ is greater than 0, and
ES = OS = 0.

16. The method of claim 15 wherein if IS is determined to be faulty, and ES and OS are determined to be not faulty, the program is modified by letting IS=ES if the coupling is fully engaged, letting IS=OS * GR if the transmission is engaged in a known gear ratio, letting IS=OS * GR if the transmission is engaged in a known gear ratio, letting IS=ES if a shift is in progress and if GR * OS is greater than engine idle speed and otherwise letting IS=0.

17. The method of claim 16, wherein the program is additionally modified by minimizing intervals of coupling disengagement.

18. The method of claim 2 wherein ES is determined to be faulty, and IS and OS are determined to be not faulty if:
$E_1$ is greater than 0;
$E_2$ is greater than 0;
$E_3 = 0$; and
IS = GR * OS $\neq 0$.

19. The method of claim 18 wherein if ES is determined to be faulty, and IS and OS are determined to be not faulty, the program is modified by letting ES=IS if the coupling is fully engaged and using the sensed value of IS prior to clutch disengagement if the clutch is not fully engaged.

20. The method of claim 18 wherein at least two of ES, IS and OS are determined to be faulty if:
$E_1 = 0$,
$E_2$ is greater than 0,
$E_3$ is greater than 0, and
ES = OS = 0.

21. The method of claim 20 wherein at least two of ES, IS and OS are determined to be faulty if:
$E_1 = 0$, $E_2$ is greater than 0,
$E_3$ is greater than 0, and
ES=OS=0.

22. The method of claim 18 wherein at least two of ES, IS and OS are determined to be faulty if:
$E_1$ is greater than 0,
$E_2$ is greater than 0,
$E_3 = 0$, and
IS=OS=0.

23. The method of claim 22 wherein if ES is determined to be faulty, and IS and OS are determined to be not faulty, the program is modified by letting ES=IS if the coupling is fully engaged and using the sensed value of IS prior to clutch disengagement if the clutch is not fully engaged.

24. The method of claim 18 wherein IS is determined to be faulty, and ES and OS are determined to be not faulty, if:
$E_1$ is greater than 0
$E_2 = 0$,
$E_3$ is greater than 0, and
ES=GR * OS≠0.

25. The method of claim 24 wherein at least two of ES, IS and OS are determined to be faulty if:
$E_1$ is greater than 0,
$E_2 = 0$
$E_3$ is greater than 0, and
ES=OS=0.

26. The method of claim 24 wherein OS is determined to be faulty, and ES and IS are determined to be not faulty if:
$E_1 = 0$,
$E_2$ is greater than 0,
$E_3$ is greater than 0, and
ES=OS≠0.

27. The method of claim 26 wherein at least two of ES, IS and OS are determined to be faulty if:
$E_1 = 0$,
$E_2$ is greater than 0,
$E_3$ is greater than 0, and
ES=OS=0.

28. The method of claim 27 wherein if IS is determined to be faulty, and ES and OS are determined to be not faulty, the program is modified by letting IS=ES if the coupling is fully engaged, letting IS=OS * GR if the transmission is engaged in a known gear ratio, letting IS=ES if a shift is in progress and if GR * OS is greater than engine idle speed, and otherwise letting IS=0.

29. The method of claim 27 wherein said input signals additionally include (6) an input signal indicative of indicative actuation of the vehicle brakes, and wherein if OS is determined to be faulty, and ES and IS are determined to be not faulty, the program is modified by letting OS=IS/GR if the transmission is engaged in a known gear ratio, letting OS=0 if a shift into transmission neutral is requested, causing a value equal to d(OS/GR)/dt to be calculated prior to change gear shift operations, and letting OS=(IS/GR)/+K where K is proportional to the time since a shift algorithm and to the value of d(IS/GR)/dt at initiation of the shift if d(IS/GR)/dt is less than zero and the vehicle brakes are applied, otherwise letting OS=last known value if IS/GR.

30. The method of claim 27 wherein if ES is determined to be faulty, and IS and OS are determined to be not faulty, the program is modified by letting ES=IS if the coupling is fully engaged and using the sensed value of IS prior to clutch disengagement if the clutch is not fully engaged.

31. The method of claim 30 wherein said input signals additionally include (6) an input signal indicative of actuation of the vehicle brakes, and wherein if OS is determined to be faulty, and ES and IS are determined to be not faulty, the program is modified by letting OS=IS/GR if the transmission is engaged in a known gear ratio, letting OS=0 if a shift into transmission neutral is requested, causing a value equal to d(OS/GR)/dt to be calculated prior to change gear shift operations, and letting OS=(IS/GR)/+K where K is proportional to the time since a shift algorithm and to the value of d(IS/GR)/dt at initiation of the shift if d(IS/GR)/dt is less than zero and the vehicle brakes are applied, otherwise letting OS=last known value of IS/GR.

32. The method of claim 30 wherein if IS is determined to be faulty, and ES and OS are determined to be not faulty, the program is modified by letting IS=ES if the coupling is fully engaged, letting IS=OS * GR if the transmission is engaged in a known gear ratio, letting IS=ES if a shift is in progress and if GR * OS is greater than engine idle speed, and otherwise letting IS=0.

33. The method of claim 32 wherein said input signals additionally include (6) an input signal indicative of actuation of the vehicle brakes, and wherein if OS is determined to be faulty, and ES and IS are determined to be not faulty, the program is modified by letting OS=IS/GR if the transmission is engaged in a known gear ratio, letting OS=0 if a shift into transmission neutral is requested, causing a value equal to d(OS/GR)/dt to be calculated prior to change gear shift operations, and letting OS=(IS/GR)/+K where K is proportional to the time since a shift algorithm and to the value of d(IS/GR)/dt at initiation of the shift if d(IS/GR)/dt is less than zero and the vehicle brakes are applied, otherwise letting OS=last known value of IS/GR.

34. A control system for controlling an automatic mechanical transmission system for devices having a throttle-controlled engine, a transmission having a plurality of gear ratio combinations selectively engagable between a transmission input shaft and a transmission output shaft, said transmission input shaft being operatively connected to said engine by means of a selectably engagable and disengagable coupling providing a substantially nonslipping driving connection between said engine and said input shaft in the fully engaged condition thereof, said automatic mechanical transmission system comprising an information processing unit having means for receiving a plurality of input signals including (1) an input signal indicative of the fully engaged condition of the coupling; (2) an input signal indicative of the currently engaged gear ratio of the transmission; (3) an input signal indicative of the rotational speed of the engine, and (4) an input signal indicative of the rotational speed of the transmission input shaft; and (5) an input signal indicative of the rotational speed of the transmission output shaft, said processing unit including means for processing said input signals in accordance with a program and for generating output signals whereby said transmission system is operated in accordance with said program, and means associated with said transmission system effective to actuate said transmission system effective to actuate said transmission system to effect engagement of said gear ratio combinations in response to said output signals from said processing unit, the control system characterized by:

means defining logic rules effect when said transmission is engaged in a known gear ratio and said coupling is fully engaged to sense the presence or absence of faulty input signals indicative of the rotational speeds of said engine, input shaft and output shaft if the following relationship is false:

$$ES = IS = GR * OS$$

wherein:
- $ES$ = the value of the input signal indicative of rotational engine speed,
- $IS$ = the value of the input signal indicative of rotational input shaft speed,
- $OS$ = the value of the input signal indicative of rotational output shaft speed, and
- $GR$ = a signal indicative of the known currently engaged gear ratio; and means defining logic rules effective if only one of said input signals indicative of the rotational speeds of said engine, input shaft and output shaft is determined to be faulty, to ignore said identified faulty input signal and to process said remaining input signals to determine an acceptable value for the identified faulty input signal.

35. The control system of claim 34 wherein the identity of a faulty input signal indicative of the rotational speed of said engine, input shaft and output shaft is sensed by calculating the values of:

$$E_1 = |ES - IS|$$
$$E_2 = |ES - (GR * OS)|$$
$$E_3 = |IS - (GR * OS)|.$$

36. The control system of claim 35 wherein ES is determined to be faulty, and IS and OS are determined to be not faulty if:
- $E_1$ is greater than 0;
- $E_2$ is greater than 0;
- $E_3 = 0$; and
- $IS = GR * OS = 0$.

37. The control system of claim 36 wherein if ES is determined to be faulty, and IS and OS are determined to be not faulty, the program is modified by letting ES = IS if the coupling is fully engaged and using the sensed value of IS prior to clutch disengagement if the clutch is not fully engaged.

38. The control system of claim 35 wherein IS is determined to be faulty, and ES and OS are determined to be not faulty, if:
- $E_1$ is greater than 0
- $E_2 = 0$,
- $E_3$ *is greater than* 0, and
- $ES = GR * OS = 0$.

39. The control system of claim 38 wherein said input signals additionally include (6) an input signal indicative of actuation of the vehicle brakes, and wherein if OS is determined to be faulty, and ES and IS are determined to be not faulty, the program is modified by letting OS = IS/GR if the transmission is engaged in a known gear ratio, letting OS = 0 if a shift into transmission neutral is requested, causing a value equal to d(OS/GR)/dt to be calculated prior to change gear shift operations and letting OS = (IS/GR)/+K where K is proportional to the time since a shift operation commenced and to the value of d(IS/GR)/dt at initiation of the shift if d(IS/GR)/dt is less than zero and the vehicle brakes are applied, otherwise letting OS = last known value of IS/GR.

40. The control system of claim 35 wherein IS is determined to be faulty, and ES and OS are determined to be not faulty, if:
- $E_1$ is greater than 0
- $E_2 = 0$,
- $E_3$ is greater than 0, and
- $ES = GR * OS = 0$.

41. The control system of claim 40 wherein if IS is determined to be faulty, and ES and OS are determined to be not faulty, the program is modified by letting IS = ES if the coupling is fully engaged, letting IS = OS * GR if the transmission is engaged in a know gear ratio, letting IS = ES if a shift is in progress and if GR * OS is greater than engine idle speed, and otherwise letting IS = 0.

42. The control system of claim 41 wherein said program is additionally modified by minimizing intervals of coupling disengagement.

* * * * *